United States Patent [19]

Okamoto et al.

[11] Patent Number: 5,091,482
[45] Date of Patent: Feb. 25, 1992

[54] BLEND OF POLYCARBONATE CAPPED WITH PHENOLIC CHAIN TERMINATOR MIXTURE

[75] Inventors: Masaya Okamoto; Hiroshi Kurokawa, both of Ichihara, Japan

[73] Assignee: Idemitsu Petrochemical Co., Ltd., Tokyo, Japan

[21] Appl. No.: 578,633

[22] Filed: Sep. 7, 1990

Related U.S. Application Data

[62] Division of Ser. No. 327,710, Mar. 23, 1989, Pat. No. 4,977,233.

[30] Foreign Application Priority Data

Mar. 28, 1988 [JP] Japan .................. 63/71984
Apr. 27, 1988 [JP] Japan .................. 63/102615

[51] Int. Cl.$^5$ .................................. C08L 69/00
[52] U.S. Cl. ......................................... 525/462
[58] Field of Search ............................ 525/462

[56] References Cited

U.S. PATENT DOCUMENTS 4,977,233  12/1990  Okamoto et al. ............. 528/198

*Primary Examiner*—Harold D. Anderson
*Attorney, Agent, or Firm*—Antonelli, Terry, Stout & Kraus

[57] ABSTRACT

A polycarbonate having a principal chain comprising a repeating unit represented by the formula:

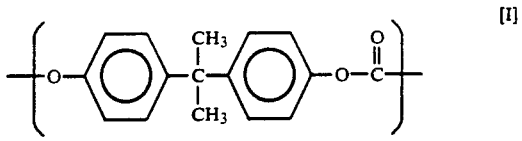

(a) a substituted phenoxy group represented by the formula (II)

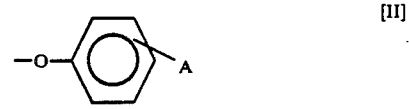

(wherein A is as defined in the appended specification) and (b) p-tert-butyl phenoxy group represented by the formula (III)

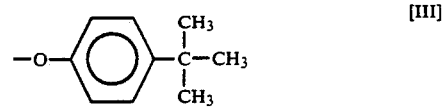

and/or the phenoxy group represented by the formula (IV)

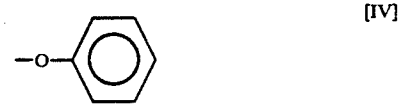

bonded to the terminals thereof in the ratio of (a) 10 to 99 mole percent of the said substituted phenoxy group, and (b) 90 to 1 mole percent of p-tert-butylphenoxy group and/or phenoxy group. This polycarbonate has so high a fluidity and an impact resistance that it is moldable into thin or complex shapes.

3 Claims, 2 Drawing Sheets

BLEND OF POLYCARBONATE CAPPED WITH PHENOLIC CHAIN TERMINATOR MIXTURE

This is a division of application Ser. No. 327,710, filed Mar. 23, 1989, now U.S. Pat. No. 4,977,233.

BACKGROUND OF THE INVENTION

1. Field of the Invention

The present invention relates to a polycarbonate, a process for production thereof, and a polycarbonate resin composition containing the said polycarbonate, and more particularly to a polycarbonate with an improved balance of fluidity and impact resistance, to a process for an efficient production thereof and to a polycarbonate resin composition comprising the said polycarbonte, the composition being excellent in various physical properties.

2. Description of the Related Arts.

Among the conventional polycarbonate products, some have high grade of fluidity with simply reduced molecular weight for being molded into complexed and thinner products. The said polycarbonates having the high fluidity, however, suffer from a disadvantage in that mechanical strength, in particular, Izod impact strength is insufficiently high at low temperature. To overcome this disadvantage, extensive investigations have been made to develop a polycarbonate having a high mechanical strength maintained even when reduced in molecular weight.

As a result of the said investigations, it has been found that the polycarbonate employing both cumylphenol (i.e., α, α-dimethylbenzylphenol) or tert-octylphenol (i.e., 1,1,3,3-tetramethylbutylphenol), and p-tert-butylphenol or phenol as molecular weight modifiers in a predetermined ratio, which are bonded to the terminals of the molecules, has the desired properties suitable for the said polycarbonate. The present invention has been attained based on the above findings.

SUMMARY OF THE INVENTION

An object of the present invention is to provide a polycarbonate having an improved balance of fluidity and impact resistance.

Another object of the present invention is to provide a polycarbonate having superior Izod impact strength at low temperatures.

Still another object of the present invention is to provide the polycarbonate having superior moldability into the thinner or complex products.

A further object of the present invention is to provide a process for efficiently producing the said polycarbonate.

A still further object of the present invention is to provide a resin composition comprising the said polycarbonate and being excellent in various properties.

The present invention is to provide a polycarbonate having a principal chain comprising a repeating unit represented by the formula:

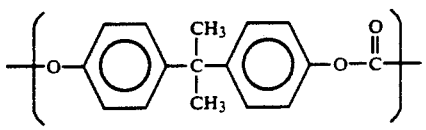

[I]

(a) A substituted phenoxy group represented by the formula:

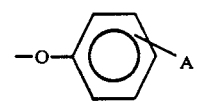

[II]

(wherein A is an α,α-dimethylbenzyl group represented by the formula:

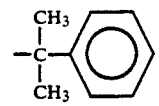

or a 1,1,3,3-tetramethylbutyl group represented by the formula:

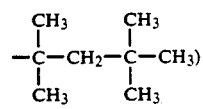

and (b) a p-tert-butylphenoxy group represented by the formula:

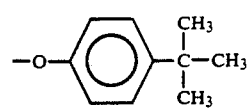

[III]

and/or a phenoxy group represented by the formula:

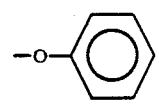

[IV]

bonded to the terminals of the molecules in the ratio of (a) 10 to 99 mole percent of the said substituted phenoxy group and (b) 90 to 1 mole percent of a p-tert-butylphenoxy group and/or a phenoxy group.

The present invention also provides a process for producing the polycarbonate using a molecular weight modifier comprising:

(a) 10 to 99 mole percent of a substituted phenol represented by the formula:

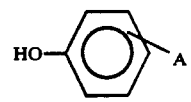

[II']

(wherein A is the same as defined above) and (b) 90 to 1 mole percent of p-tert-butylphenol and/or phenol.

The present invention also provides a polycarbonate resin composition comprising 100 parts by weight of the said polycarbonate and 0.01 to 0.13 part by weight of phosphoric antioxidant.

DESCRIPTION OF PREFERRED EMBODIMENTS

Figure 1:
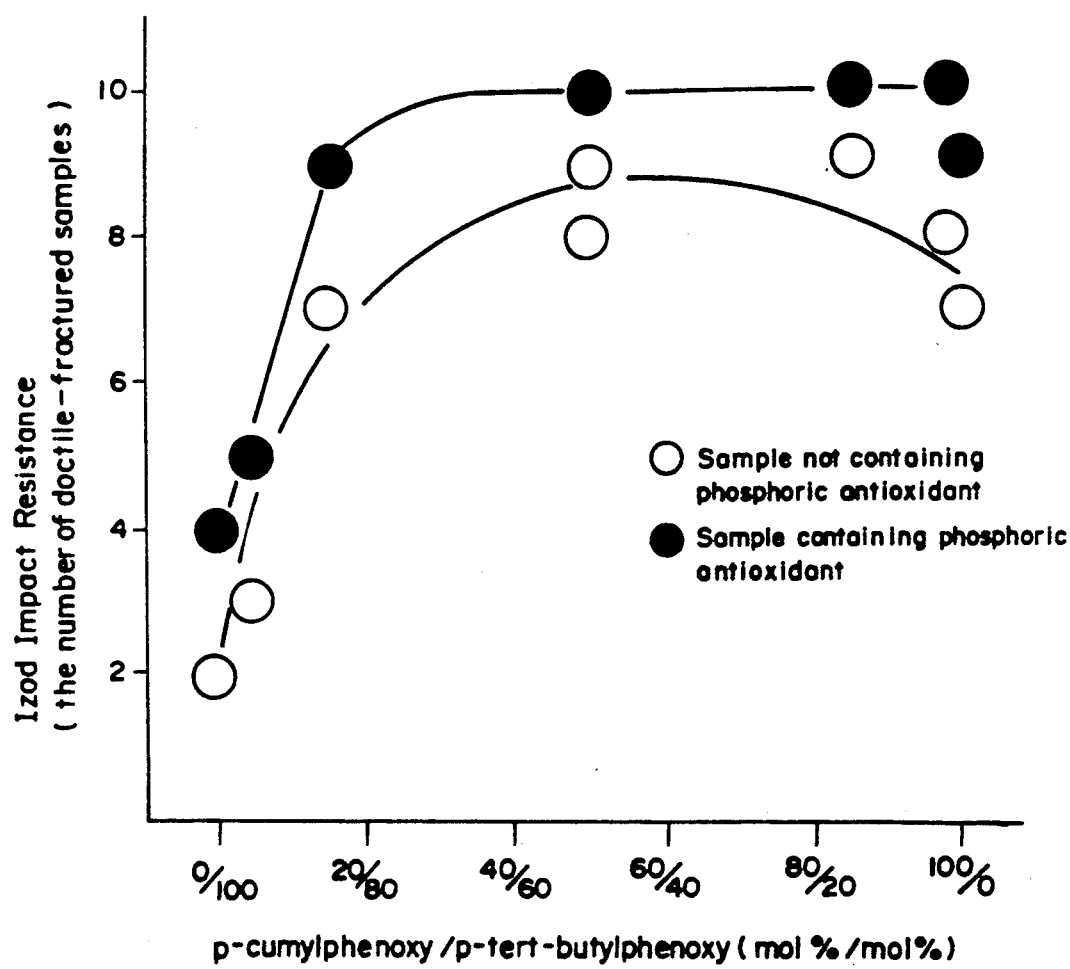
FIG. 1 shows the relationship between the Izod impact strength of the sample obtained from the polycarbonate resin or composition of it and mole ratio of p-cumylphenoxy group and p-tert-butylphenoxy group in the said sample given in the examples, comparative examples, and reference examples.

The polycarbonate of the present invention has the principal chain comprising a repeating unit represented by the said formula (I), and terminators comprising both a substituted phenoxy group (end group (a)) represented by the formula (II), and p-tert-butylphenoxy group represented by the formula (III) and/or phenoxy group represented by the formula (IV) (end group (b)) in the following ratio: 10 to 99 mole percent of end group (a) and 90 to 1 mole percent of end group (b), preferably 20 to 99 mole percent of end group (a) and 80 to 1 mole percent of end group (b). If end group (a) is below 10 mole percent, the mechanical strength is not sufficient.

The substituted phenoxy groups i.e., the abovementioned end group (a) represented by the formula (II) can be classified into: cumylphenoxy group represented by the formula:

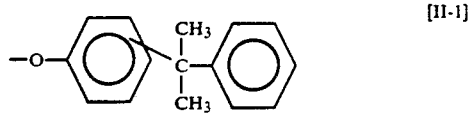

[II-1]

(i.e., α, α-dimethylbenzyl phenoxy group, (p-cumylphenoxy group, o-cumylphenoxy group, and m-cumylphenoxy group; particularly, p-cumylphenoxy group is preferred.); and tert-octylphenoxy group represented by the formula:

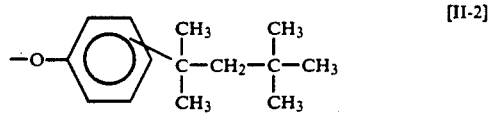

[II-2]

(i.e., p-tert-octylphenoxy group, o-tert-octylphenoxy group, and m-tert-octylphenoxy group; particularly, p-tert-octylphenoxy group is preferred.) End group (a) of the polycarbonate of the present invention is cumylphenoxy group represented by the formula (II-1), tert-octylphenoxy group represented by the formula (II-2), or a mixture thereof.

The polycarbonate of the present invention comprises the mixture of (1) the principal chain comprising the repeating unit represented by the formula (I), bonded to an end group (a) at one terminal thereof and to an end group (b) at the other terminal (2) the principal chain comprising the repeating unit represented by the formula (I), bonded to end groups (a) at both terminals thereof, (3) the principal chain having the repeating unit represented by the formula (I), bonded to end groups (b) at both the terminals thereof (for example, mixtures of (1) to (3), mixtures of (1) and (2), mixtures of (1) and (3), or mixtures of (2) and (3)). The average values of these end groups are assumed to be the ratio as mentioned above (mole %).

The molecular weight of the polycarbonate of the present invention is not critical. Usually, the viscosity average molecular weight is 10,000 or more, preferably 10,000 to 50,000, and the most preferably 15,000 to 30,000.

The polycarbonate of the present invention has the principle chain comprising the repeating unit represented by the said formula (I) bonded to end groups (a) and (b) at the terminals of the molecules. The molecular chain may contain a small amount of a repeating unit other than the said repeating unit of the formula (I).

The polycarbonate of the present invention can be produced by various methods, including two typical ones as follows. Method I: a method in which used are the molecular weight modifier comprising (a) 10 to 99 mole percent of substituted phenol represented by the formula (II') (specifically, p-cumylphenol, o-cumylphenol, m-cumylphenol, or p-tert-octylphenol, o-tert-octylphenol, m-tert-octylphenol), and (b) 90 to 1 mole percent of p-tert-butylphenol and/or phenol. Method II: a method in which (a) 10 to 99 mole percent of polycarbonate with the said substituted phenoxy group represented by the formula (II) at the terminals of the molecules, and (b) 1 to 90 mole percent of polycarbonate with p-tert-butylphenoxy group and/or phenoxy group at the terminals of the molecules are kneaded.

In the said Method I, the desired polycarbonate can be obtained by performing interfacial polycondensation reaction adding the said molecular weight modifier (comprising (a) 10 to 99 mole percent of substituted phenol of the formula (II') and (b) 90 to 1 mole percent of p-tert-butylphenol and/or phenol) to the reaction system before or after bisphenol A and phosgene dissolved in alkali solution are reacted with each other in the presence of the inert organic solvent. This can be achieved also by the pyridine method in which bisphenol A and the said molecular weight modifier are dissolved in pyridine or the mixed solvent of pyridine and inert organic solvent and phosgene is blown in this solution for reaction.

Instead of bisphenol A used as a raw material or together with the said bisphenol A, another bivalent phenol can be used. In this case, the polycarbonate has the principal chain comprising the repeating unit corresponding to the bivalent phenol used.

The polycarbonate resulted by Method I mainly comprises the mixture of (1) to (3) described above.

On the other hand, in Method II, the desired polycarbonate can be obtained by producing polycarbonate ($A_1$) having the substituted phenoxy group of the formula (II) at the molecular terminal by reacting bisphenol A with phosgene using the substituted phenol of the formula (II') as a molecular weight modifier; producing polycarbonate ($A_2$) having p-tert-butylphenoxy group and polycarbonate ($A_3$) having phenoxy group at molecular terminal by reacting bisphoenol A with phosgene using p-tert-butylphenol and/or phenol as a molecular weight modifier; and kneading 10 to 99 mole percent of polycarbonate $A_1$ and/or 90 to 1 mole percent of polycarbonate $A_2$ and/or $A_3$. Instead of or in addition to the said polycarbonates $A_2$ and $A_3$, a polycarbonate having a p-tert-butylphenoxy group at a molecular end and a phenoxy group at the other end can also be used.

The polycarbonate obtained by the above described Method II mainly comprises the mixture of (2) and (3).

The polycarbonate itself of the present invention has sufficient mechanical properties and moldability because the specific substituents are bonded to the terminals at a definite ratio, and the polycarbonate resin composition made by adding 0.01 to 0.13 parts by weight of phosphoric antioxidant per 100 parts by weight of polycarbonate has still superior properties. This composition can be obtained by mixing the said polycarbonate with the phosphoric antioxidant by a conventional method.

Examples of the phosphoric antioxidant used are as follows: trialkyl phosphites such as tris(nonylphenyl)phosphites, 2-ethylhexydiphenylphosphite, trimethylphosphite, triethylphosphite, tributylphosphite, trioctylphosphite, trinonylphosphite, tridecylphosphite, trioctadecylphosphite, distearilpentaerythrityldiphosphite, tris(2-chloroethyl) phosphite, tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(butylphenyl)phosphite, tris(hydroxyphenyl)phosphite. trialkylphosphates such as trimethylphosphate. triethylphosphate. tributylphosphate. trioctylphosphate. tridecylphosphate, trioctadecylphosphate, distearylpentaerythrityldiphosphate, tris(2-chloroethyl) phosphate, tris(2,3-dichloropropyl)phosphate; tricycloalkylphosphates such as tricyclohexylphosphate; triarylphosphates such as triphenylphosphate, tricresylphosphate, tris(nonylphenyl)phosphate, 2-ethylphenyldiphenylphosphate. These can be used solely or in combination with one another.

The amount of phosphoric antioxidant must be determined within the range of 0.01 to 0.13 part by weight per 100 parts by weight of the polycarbonate of the present invention as mentioned above. If the amount of phosphoric antioxidant is less than 0.01 part by weight, the resulting resin composition is not sufficiently improved in mechanical strength and is liable to be colored. Alternatively, if it exceeds 0.13 parts by weight, the polycarbonate resin composition tends to be lowered in mechanical strength.

The polycarbonate resin composition of the present invention can be added with other additives such as lubricant if necessary. The lubricants used are stearylalcohol, stearic acid monoglyceride, pentaerythritolstearic acid ester, beeswax, etc. This lubricant should be added within the range of 2,000 to 4,000 ppm per the composition to improve mold-releasing property.

The composition of the present invention can also be added with inorganic filler, flame retardant, stabilizer, colorant, etc.

According to the present invention, a polycarbonate resin and polycarbonate resin composition having high fluidity and high impact-resistance, excellent in fluidity and impact strength, particularly in impact strength at low temperatures can be obtained.

The polycarbonate resin and polycarbonate resin compositions of the present invention can therefore be molded into thin film or complex shapes that has been difficult, and can maintain sufficient mechanical strength even if reduced in molecular weight to be of high fluidity grade.

The polycarbonate resin and its compositions are used widely and efficiently for industrial materials such as home electric appliances, office automation equipment, building materials, etc.

The present invention is described in more detail by referring to examples and comparative examples.

PREPARATION EXAMPLES

Preparation of Polycarbonate Oligomer

Sixty kilograms of bisphenol A was dissolved in 400 liters of 5 percent sodium hydroxide aqueous solution to prepare sodium hydroxide aqueous solution containing bisphenol A.

Then, the said sodium hydroxide aqueous solution containing bisphenol A maintained at room temperature and methylene chloride were introduced into the tubular reactor having inner diameter of 10 mm and the length of 10 m through the orifice plate at flow rates of 138 liters/hour and of 69 liters/hour, respectively. Thereafter, phosgene was blown at flow rate of 10.7 kg/hour concurrently for three hours. The tubular reactor was duplex and the exhaust temperature of reaction fluid was maintained to 25° C. by passing coolant through the jacket. pH of the exhaust fluid was adjusted to 10 to 11. The reaction fluid was allowed to stand to separate and remove the aqueous phase. To the methylene chloride phase (220 liters) collected, 170 liters of methylene chloride was added, then agitated sufficiently to produce polycarbonate oligomer (317 g/liter in concentration). The polycarbonate oligomer has degree of polymerization of 3 to 4.

Production Example 1 (Production of polycarbonate resin $A_1$)

p-cumylphenol (0.51 mole) was dissolved as a molecular weight modifier in 9.0 liters of the polycarbonate oligomer obtained in the Preparation Example. On the other hand, 23.5 g (0.59 mole) of sodium hydroxide was dissolved in 600 cc of water and 5.2 cc of triethylamine was added to the solution. Then the resulting solution was added to the polycarbonate oligomer in which the said molecular weight modifier was dissolved, and agitated for one hour at 500 rpm at ordinary temperature.

Then 9.6 liters of methylene chloride and sodium hydroxide aqueous solution containing bisphenol A (consisting of 611 g of bisphenol A and 357 g of sodium oxide) were added, and the resulting mixture was stirred at 500 rpm for two hours at ordinary temperature.

After that, 3 liters of methylene chloride was added thereto, washed with 5 liters of water, alkali-cleaned with 5 liters of 0.01 normal sodium hydroxide aqueous solution, acid-cleaned with 5 liters of 0.1 normal hydrochloric acid aqueous solution, and cleaned with 5 liters of water in this order. Finally, the methylene chloride was removed to obtain the chipped polycarbonate (i.e., polycarbonate resin $A_1$).

This polycarbonate resin $A_1$ has a viscosity average molecular weight of $1.9 \times 10^4$.

Production Example 2 (Production of polycarbonate resin $A_2$)

The chipped polycarbonate (polycarbonate resin $A_2$) was obtained in the same manner as in Production Example 1 except that the molecular weight modifier was replaced from p-cumylphenol to p-tert-butylphenol. The resulting polycarbonate resin $A_2$ had a viscosity average molecular weight of $1.9 \times 10^4$.

Production Example 3 (Production of polycarbonate resin $A_3$)

The chipped polycarbonate (polycarbonate resin $A_3$) was obtained in the same manner as in Production Example 1 except that the molecular weight modifier was replaced from p-cumylphenol to phenol. The resulting polycarbonate resin A₃ had a viscosity average molecular weight of $1.9 \times 10^4$.

Production Example 4 (Production of polycarbonate resin A₄)

The chipped polycarbonate (polycarbonate resin A₄) was obtained in the same manner as in Production Example 1 except that the molecular weight modifier was replaced to 0.255 mole of p-cumylphenol and 0.255 mole of p-tert-butylphenl instead of 0.51 mole of p-cumylphenol. The resulting polycarbonate resin A₄ had a viscosity average molecular weight of $1.9 \times 10^4$.

Production Example 5 (Production of polycarbonate resin A₅)

The chipped polycarbonate (polycarbonate resin A₅) was obtained in the same manner as in Production Example 1 except that the molecular weight modifier was replaced to 0.459 mole of p-cumylphenol and 0.051 mole of phenol instead of 0.51 mole of p-cumylphenol. The polycarbonate resin A₅ had a viscosity average molecular weight of $1.9 \times 10^4$.

EXAMPLES 1 TO 9, COMPARATIVE EXAMPLE 1, AND REFERENCE EXAMPLES 1 TO 3

The polycarbonate resins obtained in Preparation Examples described above were mixed in the ratios by weight shown in Table 1 and granulated by an extruder at temperatures of 220 to 270° C. The pellet thus obtained was injection-molded, and Izod impact strength was measured. The results are shown in Table 2.

TABLE 1

| | | |
|---|---|---|
| Example 1 | A₁:98%, | A₂:2% |
| Example 2 | A₁:95%, | A₃:5% |
| Example 3 | A₁:85%, | A₂:15% |
| Example 4 | A₁:70%, | A₃:30% |
| Example 5 | A₁:50%, | A₂:50% |
| Example 6 | A₁:30%, | A₃:70% |
| Example 7 | A₁:15%, | A₂:85% |
| Example 8 | A₄:100%, | — |
| Example 9 | A₅:100%, | — |
| Comparative Example 1 | A₁:5%, | A₂:95% |
| Reference Example 1 | A₁:100%, | — |
| Reference Example 2 | A₂:100%, | — |
| Reference Example 3 | A₃:100%, | — |

TABLE 2

| No. | Izod impact strength*¹ | | | |
|---|---|---|---|---|
| | 5° C. | 0° C. | −5° C. | −10° C. |
| Example 1 | 10 | 10 | 8 | 3 |
| Example 2 | 10 | 10 | 8 | 3 |
| Example 3 | 10 | 10 | 9 | 4 |
| Example 4 | 10 | 10 | 9 | 4 |
| Example 5 | 10 | 10 | 8 | 3 |
| Example 6 | 10 | 10 | 8 | 3 |
| Example 7 | 10 | 9 | 7 | 1 |
| Example 8 | 10 | 10 | 9 | 4 |
| Example 9 | 10 | 10 | 8 | 4 |
| Comparative Example 1 | 10 | 8 | 3 | 0 |
| Reference Example 1 | 10 | 10 | 7 | 2 |
| Reference Example 2 | 9 | 6 | 2 | 0 |
| Reference Example 3 | 9 | 5 | 1 | 0 |

TABLE 2-continued

| No. | Izod impact strength*¹ | | | |
|---|---|---|---|---|
| | 5° C. | 0° C. | −5° C. | −10° C. |
| Example 3 | | | | |

*¹According to JIS-K-7110. Each value indicates the number of ductile-fractured samples total 10 samples were tested for Izod impact resistance. Other samples were brittle-fractured. All the samples used were notched and 3 mm in thickness and measured at weigher 4.0 J.

EXAMPLES 10 TO 15, COMPARATIVE EXAMPLE 2, AND REFERENCE EXAMPLES 4 AND 5

The polycarbonate resins obtained in the Production Examples 1 to 4 and phosphoric antioxidant (B₁: tris (nonylphenyl)phosphite, and B₂: 2-ethylhexyldiphenyl-phosphite) were mixed in the ratios shown in Table 3 and granulated by an extruder at temperatures of 220 to 270° C. The resulting pellet was injection-molded to be measured for Izod impact strength. The results are shown in Table 4.

TABLE 3

| No. | % by*² weight | % by*² weight | Parts by*³ weight |
|---|---|---|---|
| Example 10 | A₁:98 | A₂:2 | B₁:0.02 |
| Example 11 | A₁:95 | A₃:5 | B₂:0.02 |
| Example 12 | A₁:85 | A₂:15 | B₁:0.05 |
| Example 13 | A₁:50 | A₂:50 | B₂:0.05 |
| Example 14 | A₅:100 | — | B₁:0.02 |
| Example 15 | A₁:15 | A₂:85 | B₁:0.02 |
| Comparative Example 2 | A₁:5 | A₂:95 | B₁:0.02 |
| Reference Example 4 | A₁:100 | — | B₁:0.02 |
| Reference Example 5 | A₂:100 | — | B₁:0.02 |

*²Indicates the portion of the polycarbonates used.
*³Indicates the parts of phosphoric antioxidants per 100 parts by weight of polycarbonate.

TABLE 4

| No. | Izod impact strength*¹ | | | |
|---|---|---|---|---|
| | 5° C. | 0° C. | −5° C. | −10° C. |
| Example 10 | 10 | 10 | 10 | 7 |
| Example 11 | 10 | 10 | 10 | 8 |
| Example 12 | 10 | 10 | 10 | 7 |
| Example 13 | 10 | 10 | 10 | 7 |
| Example 14 | 10 | 10 | 10 | 8 |
| Example 15 | 10 | 10 | 9 | 4 |
| Comparative Example 2 | 10 | 9 | 5 | 2 |
| Reference Example 4 | 10 | 10 | 9 | 4 |
| Reference Example 5 | 10 | 9 | 4 | 1 |

*¹Same as in Table 2.

The molar ratios of p-cumylphenoxy group, p-tert-butylphonoxy group, and phenoxy group contained in the polycarbonate resin or its compositions shown in the said Examples and Comparative Examples were calculated based on the measured values of the proton nuclear magnetic resonance spectrum (heavy chloroform solvent). The results are shown in Table 5.

TABLE 5

| No. | Mole ratio (%) |
|---|---|
| Example 1 | p-cumylphenoxy:p-tert-butylphenoxy = 98.2:1.8 |
| Example 2 | P-cumylphenoxy:phenoxy = 94.7:5.3 |
| Example 3 | p-cumylphenoxy:p-tert-butylphenoxy = 85.1:14.9 |
| Example 4 | P-cumylphenoxy:phenoxy = 70.4:29.6 |
| Example 5 | p-cumylphenoxy:p-tert-butylphenoxy = 50.0:50.0 |

TABLE 5-continued

| No. | Mole ratio (%) |
|---|---|
| Example 6 | P-cumylphenoxy:phenoxy = 30.5:69.5 |
| Example 7 | p-cumylphenoxy:p-tert-butylphenoxy = 15.4:84.6 |
| Example 8 | p-cumylphenoxy:p-tert-butylphenoxy = 50.1:49.9 |
| Example 9 | P-cumylphenoxy:phenoxy = 79.9:20.1 |
| Example 10 | p-cumylphenoxy:p-tert-butylphenoxy = 98.1:1.9 |
| Example 11 | P-cumylphenoxy:phenoxy = 94.8:5.2 |
| Example 12 | p-cumylphenoxy:p-tert-butylphenoxy = 85.0:15.0 |
| Example 13 | p-cumylphenoxy:p-tert-butylphenoxy = 50.1:49.9 |
| Example 14 | P-cumylphenoxy:phenoxy = 79.9:20.1 |
| Example 15 | p-cumylphenoxy:p-tert-butylphenoxy = 15.0:85.0 |
| Comparative Example 1 | p-cumylphenoxy:p-tert-butylphenoxy = 4.9:95.1 |
| Comparative Example 2 | p-cumylphenoxy:p-tert-butylphenoxy = 4.9:95.1 |

FIG. 1 shows the relationship between the Izod impact strength of samples obtained from the polycarbonate resin or its compositions shown in the said Examples, Comparative Examples, and Reference Examples at the temperature of −5° C. and the mole ratio of p-cumylphenoxy group and p-tert-butylphenoxy group in the said samples.

Production Example 6 (Production of polycarbonate resin A′$_1$)

Into 9.0 liters of the said polycarbonate oligomer obtained in the above Preparation Example, 0.51 mole of p-tert-octylphenol (that is, 4-(1,1,3,3-tetramethylbutyl)phenol) was dissolved as molecular weight modifier. 23.5 g (0.59 mole) of sodium hydroxide was dissolved in 600 cc of water, 5.2 cc of triethylamine was added to the said solution, and the resulting solution was added to the polycarbonateoligomer in which the said molecular weight modifier was dissolved, and then agitated for one hour at 500 rpm at the ordinary temperature.

Then, 9.6 liters of methylene chloride and aqueous sodium hydroxide solution of bisphenol A (containing 611 g of bisphenol A and 357 g of sodium hydroxide) were added and agitated for two hours at 500 rpm at the ordinary temperature.

Thereafter, 3 liters of the methylene chloride was added, cleaned with 5 liters of water, alkali-cleaned with 0.01 normal sodium hydroxide aqueous solution, acid-cleaned with 0.1 normal hydrochloric acid aqueous solution, and cleaned with 5 liters of water in this order. Finally, chipped polycarbonate (polycarbonate resin A′$_1$) was obtained after the methylene chloride was removed. The viscosity average molecular weight of the resulting polycarbonate resin A′$_1$ was $1.9 \times 10^4$.

Production Example 7 (Production of polycarbonate A′$_4$)

The chipped polycarbonate (polycarbonate resin A′$_4$) was obtained in the same manner as in Production Example 6 except that 0.255 mole of p-tert-octylphenol and 0.255 mole of p-tert-butylphenol were used as molecular weight modifier instead of 0.51 mole of p-tert-octylphenol in Production Example 6. The viscosity average molecular weight of the resulting polycarbonate resin A′$_4$ was $1.9 \times 10^4$.

Production Example 8 (Production of polycarbonate resin A′$_5$)

The chipped polycarbonate resin (polycarbonate resin A′$_5$) was obtained in the same manner as in Production Example 6 except that 0.459 mole of p-tert-octylphenol and 0.051 mole of phenol were used as molecular weight modifiers instead of 0.51 mole of p-tert-octylphenol in Production Example 6. The viscosity average molecular weight of the resulting polycarbonate resin A′$_5$ was $1.9 \times 10^4$.

EXAMPLES 16 TO 24, COMPARATIVE EXAMPLE 3 AND REFERENCE EXAMPLES 6

The polycarbonate resins obtained in the above Production Examples were mixed in the ratio by weight shown in Table 6 and granulated by an extruder at temperatures of 220 to 270° C. The resulting pellet was injection-molded to be measured for Izod impact strength. The results are shown in Table 7.

TABLE 6

| | | |
|---|---|---|
| Example 16 | A′$_1$:98%, | A$_2$:2% |
| Example 17 | A′$_1$:95%, | A$_3$:5% |
| Example 18 | A′$_1$:85%, | A$_2$:15% |
| Example 19 | A′$_1$:70%, | A$_3$:30% |
| Example 20 | A′$_1$:50%, | A$_2$:50% |
| Example 21 | A′$_1$:30%, | A$_3$:70% |
| Example 22 | A′$_1$:15%, | A$_2$:85% |
| Example 23 | A′$_4$:100%, | — |
| Example 24 | A′$_5$:100%, | — |
| Comparative Example 3 | A′$_1$:5%, | A$_2$:95% |
| Reference Example 6 | A′$_1$:100%, | — |

TABLE 7

| | Izod impact strength*$^1$ | | | |
|---|---|---|---|---|
| No. | 5° C. | 0° C. | −5° C. | −10° C. |
| Example 16 | 10 | 10 | 8 | 4 |
| Example 17 | 10 | 10 | 8 | 4 |
| Example 18 | 10 | 10 | 8 | 3 |
| Example 19 | 10 | 10 | 9 | 4 |
| Example 20 | 10 | 10 | 9 | 4 |
| Example 21 | 10 | 10 | 8 | 3 |
| Example 22 | 10 | 9 | 6 | 1 |
| Example 23 | 10 | 10 | 9 | 4 |
| Example 24 | 10 | 10 | 8 | 3 |
| Comparative Example 3 | 10 | 7 | 4 | 0 |
| Reference Example 6 | 10 | 10 | 7 | 2 |

*$^1$Same as *$^1$ shown in Table 1.

EXAMPLES 25 TO 30, COMPARATIVE EXAMPLE 4, AND REFERENCE EXAMPLE 7

The polycarbonate resin obtained in above Production Example and phosphoric antioxidant (B$_1$: tris(nonylphenyl)phosphite and B$_2$: 2-ethylhexyldiphenylphosphite) were mixed and granulated by an extruder at temperatures of 220 to 270° C. The pellet resulted was injection-molded to be measured for Izod impact strength. The results are shown in Table 9.

TABLE 8

| No. | % by*$^2$ weight | % by*$^2$ weight | Parts by*$^3$ weight |
|---|---|---|---|
| Example 25 | A′$_1$:98 | A$_2$:2 | B$_1$:0.02 |
| Example 26 | A′$_1$:95 | A$_3$:5 | B$_2$:0.02 |
| Example 27 | A′$_1$:85 | A$_2$:15 | B$_1$:0.05 |
| Example 28 | A′$_1$:50 | A$_2$:50 | B$_2$:0.05 |
| Example 29 | A′$_1$:15 | A$_2$:85 | B$_1$:0.02 |
| Example 30 | A′$_5$:100 | — | B$_1$:0.02 |
| Comparative Example 4 | A′$_1$:98 | A$_2$: | B$_1$:0.02 |
| Reference | A′$_1$:100 | — | B$_1$:0.02 |

TABLE 8-continued

| No. | % by*2 weight | % by*2 weight | Parts by*3 weight |
|---|---|---|---|
| Example 7 | | | |

*2Indicates the portion of the polycarbonates used.
*3Indicates the parts by weight of the phosphoric antioxidants per 100 parts by weight of polycarbonate.

TABLE 9

| | Izod impact strength*1 | | | |
|---|---|---|---|---|
| No. | 5° C. | 0° C. | −5° C. | −10° C. |
| Example 25 | 10 | 10 | 10 | 7 |
| Example 26 | 10 | 10 | 10 | 7 |
| Example 27 | 10 | 10 | 10 | 8 |
| Example 28 | 10 | 10 | 10 | 8 |
| Example 29 | 10 | 10 | 8 | 3 |
| Example 30 | 10 | 10 | 10 | 8 |
| Comparative Example 4 | 10 | 8 | 4 | 1 |
| Reference Example 7 | 10 | 10 | 9 | 3 |

*1Same as *1 shown in Table 7.

Next, the mole ratios of p-tert-octylphenoxy group, p-tert-butylphenoxy group, and phenoxy group contained in the polycarbonate resin or its compositions shown in the said Examples and Comparative Examples were calculated based on the measured value of the proton nuclear magnetic resonance spectrum (heavy chloroform solvent). The (calculation) results are shown in Table 10.

TABLE 10

| No. | Mole ratio (%) |
|---|---|
| Example 16 | p-tert-octylphenoxy:p-tert-butylphenoxy = 98.1:1.9 |
| Example 17 | P-tert-octylphenoxy:phenoxy = 94.8:5.2 |
| Example 18 | p-tert-octylphenoxy:p-tert-butylphenoxy = 85.0:15.0 |
| Example 19 | P-tert-octylphenoxy:phenoxy = 70.3:29.7 |
| Example 20 | p-tert-octylphenoxy:p-tert-butylphenoxy = 50.1:49.9 |
| Example 21 | P-tert-octylphenoxy:phenoxy = 30.5:69.5 |
| Example 22 | p-tert-octylphenoxy:p-tert-butylphenoxy = 15.4:84.6 |
| Example 23 | p-tert-octylphenoxy:p-tert-butylphenoxy = 50.0:50.0 |
| Example 24 | P-tert-octylphenoxy:phenoxy = 80.1:19.9 |
| Example 25 | p-tert-octylphenoxy:p-tert-butylphenoxy = 98.2:1.8 |
| Example 26 | P-tert-octylphenoxy:phenoxy = 94.7:5.3 |
| Example 27 | p-tert-octylphenoxy:p-tert-butylphenoxy = 85.1:14.9 |
| Example 28 | p-tert-octylphenoxy:p-tert-butylphenoxy = 49.9:50.1 |
| Example 29 | p-tert-octylphenoxy:p-tert-butylphenoxy = 15.1:84.9 |
| Example 30 | P-tert-octylphenoxy:phenoxy = 80.0:20.0 |
| Comparative Example 3 | p-tert-octylphenoxy:p-tert-butylphenoxy = 5.0:95.0 |
| Comparative Example 4 | p-tert-octylphenoxy:p-tert-butylphenoxy = 4.9:95.1 |

Figure 2:
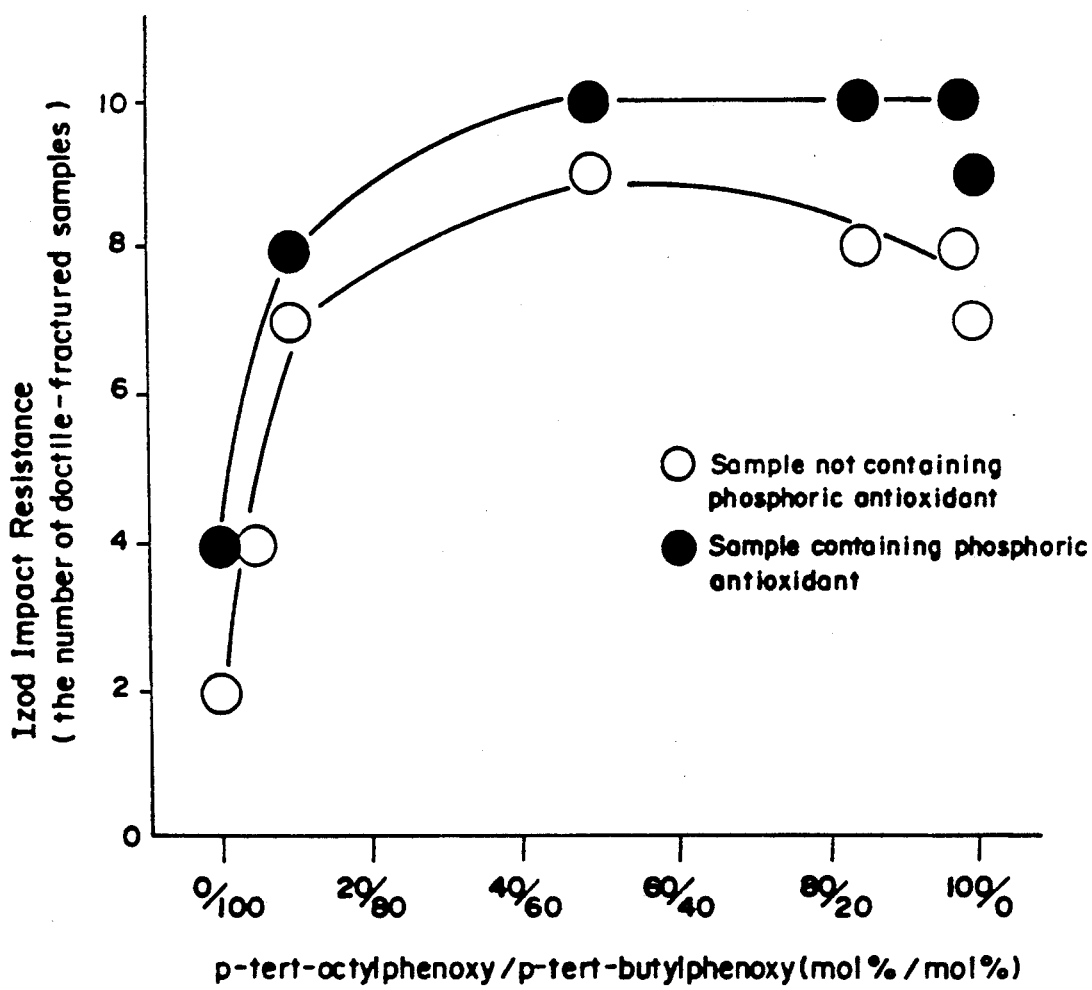
FIG. 2 shows the relationship between the Izod impact strength of the sample obtained from the polycarbonate resin or the composition of it and mole ratio of p-tert-octylphenoxy group and p-tert-butylphenoxy group.

FIG. 2 shows the relationship between the Izod impact strength of samples obtained from the polycarbonate resin or resin composition shown in the said Examples, Comparative Examples and Reference Examples at the temperature of −5° C. and the mole ratio of p-tert-octylphenoxy group and p-tert-butylphenoxy group in the said samples.

What is claimed is:

1. A polycarbonate blend having a principal chain comprising a repeating unit represented by the formula:

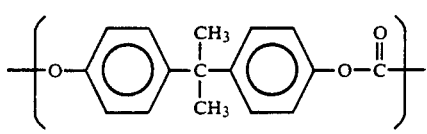

and (a) substituted phenoxy group represented by the formula:

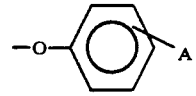

wherein A is α, α-dimethylbenzyl group represented by the formula:

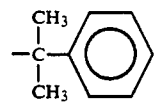

or 1,1,3,3-tetramethylbutyl group represented by the formula:

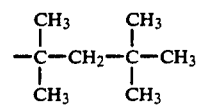

and (b) at least one group selected from the group consisting of p-tert-butylphenoxy group represented by the formula:

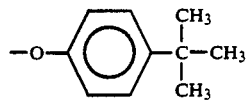

and phenoxy group represented by formula (IV)

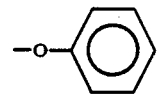

bonded at the terminals of the molecules in the ratio of (a) 10 to 99 mole percent of the substituted phenoxy group and (b) 90 to 1 mole percent of the at least one group selected from the group consisting of p-tert-butylphenoxy group and phenoxy group, and wherein the polycarbonate blend is a mixture of a polycarbonate having (a) the substituted phenoxy group represented by the formula (II) bonded to the terminal of the molecule and a polycarbonate having (b) at least one group selected from the group consisting of the p-tert-butyl phenoxy group and phenoxy group bonded to the terminal of the molecule.

2. The polycarbonate as defined in claim 1, wherein (a) the substituted phenoxy group is p-cumylphenoxy group represented by the formula:

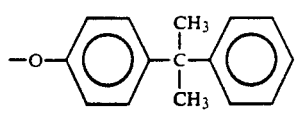
3. The polycarbonate as defined in claim 1, wherein (a) the substituted phenoxy group is tert-octyl phenoxy group represented by the formula:
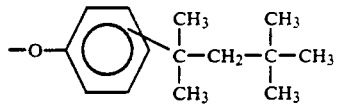
* * * * *